(12) United States Patent
Suh et al.

(10) Patent No.: US 7,580,336 B2
(45) Date of Patent: Aug. 25, 2009

(54) OPTICAL HEAD HAVING A BEAM INPUT/OUTPUT COUPLER ON A PLANAR WAVEGUIDE

(75) Inventors: Dong Woo Suh, Daejeon (KR); Yong Woo Park, Daejeon (KR); Mun Cheol Paek, Daejeon (KR); Ho Jun Ryu, Seoul (KR); Hee Sook Chung, Daejeon (KR); Kwang Yong Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 615 days.

(21) Appl. No.: 11/270,998

(22) Filed: Nov. 10, 2005

(65) Prior Publication Data

US 2006/0120249 A1 Jun. 8, 2006

(30) Foreign Application Priority Data

Dec. 8, 2004 (KR) ........................ 10-2004-0103073
Jun. 20, 2005 (KR) ........................ 10-2005-0053053

(51) Int. Cl.
*G11B 7/135* (2006.01)
(52) U.S. Cl. ..................... 369/112.27; 369/112.01
(58) Field of Classification Search .................. None
See application file for complete search history.

(56) References Cited

U.S. PATENT DOCUMENTS 4,737,946 A * 4/1988 Yamashita et al. ....... 369/44.12

FOREIGN PATENT DOCUMENTS

DE 3921 406 A1 1/1990

(Continued)

OTHER PUBLICATIONS

'Small Integrated Optical Head Device Using a Blue-Violet Laser Diode for Blu-Ray Disc System' Manoh et al., Jpn. J. Appl. Phys. vol. 42 (2003) pp. 880-884, Part 1, No. 2B, Feb. 2003, The Japan Society of Applied Physics.

(Continued)

*Primary Examiner*—Joseph H Feild
*Assistant Examiner*—Christopher R Lamb
(74) *Attorney, Agent, or Firm*—Ladas & Parry LLP

(57) ABSTRACT

An optical head has a beam input/output coupler on a planar waveguide and other parts including: a light transmitting element emitting a beam; a planar waveguide formed on a substrate and receiving the beam oscillated from the light transmitting element; a beam input/output coupler integrated as a thin film on a portion of the planar waveguide and receiving the beam through the planar waveguide to transmit the beam vertically toward a disc positioned above the planar waveguide or transmitting the beam reflected from the disc through the planar waveguide; and light receiving elements receiving the beam propagated to the planar waveguide through the beam input/output coupler.

20 Claims, 6 Drawing Sheets

U.S. PATENT DOCUMENTS

| | | | |
|---|---|---|---|
| 4,797,867 A * | 1/1989 | Sunagawa et al. | 369/44.12 |
| 4,861,128 A * | 8/1989 | Ishikawa et al. | 385/37 |
| 4,866,694 A * | 9/1989 | Korth | 369/44.12 |
| 5,166,989 A * | 11/1992 | Kurdi et al. | 385/11 |
| 5,208,800 A * | 5/1993 | Isobe et al. | 369/112.27 |
| 5,701,289 A | 12/1997 | Nagano | |
| 6,999,660 B2 * | 2/2006 | Park et al. | 385/37 |
| 2004/0042377 A1 * | 3/2004 | Nikolai et al. | 369/112.09 |

FOREIGN PATENT DOCUMENTS

| | | |
|---|---|---|
| EP | 0 360 209 A2 | 3/1990 |
| JP | 61-248245 | 11/1986 |
| JP | 63-164033 | 7/1988 |
| JP | 2004-095138 | 3/2004 |
| KR | 102004021027 | 3/2004 |
| WO | 99/31658 A1 | 6/1999 |
| WO | WO02 058059 | 7/2002 |

OTHER PUBLICATIONS

Yongwoo Park, et al; "A Leaky-Mode Directional Coupler for a Blue Laser Waveguide Lens", Conference on: Diffractive Optics and Micro-Optics (DOMO), Oct. 10, 2004, XP007906523 Rochester, New York.

European Search Report: dated Dec. 12, 2008; Application No./Patent No. 05257138.7-2210/1669987.

* cited by examiner

| waveguide | LAYER | THICKNESS (μm) | Δn |
|---|---|---|---|
| LEAKY MODE DIRECTIONAL COUPLER | UPPER CLAD LAYER | 1 (x<0) | 0.31 |
| | INNER CLAD LAYER | 0.2(0≤x<0.2) | 0.06 |
| | LEAKY CORE LAYER | 1.8(0.2≤x<3.0) | 0.0036 |
| PLANAR WAVEGUIDE | LOWER CLAD LAYER | 1.2(3.0≤x<4.2) | 0 |
| | PLANAR CORE LAYER | 2.0(4.2≤x<6.0) | 0.0027 |
| | SUBSTRATE | ∞(6.0≤x) | 0 |

OPTICAL HEAD HAVING A BEAM INPUT/OUTPUT COUPLER ON A PLANAR WAVEGUIDE

CROSS-REFERENCE TO RELATED PATENT APPLICATION

This application claims the benefit of Korean Patent Application Nos. 10-2004-0103073 filed on Dec. 8, 2004 and 10-2005-0053053 filed on Jun. 20, 2005 in the Korean Intellectual Property Office, the disclosures of which are incorporated herein in their entirety by reference.

BACKGROUND OF THE INVENTION

1. Field of the Invention

The present invention relates generally to an optical head recording and/or reproducing information on or from an optical or magneto-optical disc (disk) using optical or magneto-optical characteristics, and more particularly, to an optical head having an innovatively reduced thickness.

2. Description of the Related Art

In general, optical heads are used to record and/or reproduce information on or from compact discs (CDs), digital versatile discs (DVDs), blue-ray discs (BDs), or MP3 players using optical discs. An optical head includes many individual optical parts such as the light transmitting/receiving elements (i.e., the light emitting/receiving elements including a laser diode (LD) and a photo diode (PD)), a mirror, a prism, a beam splitter (BS), a polarization beam splitter (PBS), and a hologram optical element (HOE).

An optical head is made by assembling these individual optical parts each of which has thickness and volume in the 3-dimensional space, and this is an obstacle to reducing the overall thickness of the optical head. However, reduction of the optical head thickness is an important design requirement of the modern mobile optical discs, which are no longer stationary but are portable devices, i.e., easily carryable and movable. To achieve this, the thickness of the optical head must be innovatively reduced.

FIG. 1 is a cross-sectional view of an example of an optical head used in an MP3 player according to prior art.

The optical head shown in FIG. 1 is published in PCT International Application No. PCT/US02/00875 and PCT International Publication No. WO 02/058059 A2, entitled "Beamshaper for Optical Head" by Dataplay, INC. In the optical head shown in FIG. 1, an LD 4, a PD 6, an objective lens 8, a prism 10, a mirror 12, and a PBS 14 are disposed 3-dimensionally on a substrate 2. As shown in FIG. 1, the beam 20 emitted from the LD 4 is incident on a disc 16 through the prism 10, the mirror 12, the PBS 14, and the objective lens 8. The beam 20 is reflected from the disc 16 and then incident on the PD 6 through the PBS 14.

Because each of the optical parts in the optical head as shown in FIG. 1 has a predetermined volume and disposed in the 3-dimensional space, the overall thickness of the optical head, even if the objective lens 8 is excluded, ends up being undesirably large for mobility. This also means that the overall thickness of an optical head such as that shown in FIG. 1 may not be readily reduced as long as many individual parts as shown in FIG. 1 are assembled into an optical head, mainly because the thickness of each of the individual parts will add up.

FIG. 2 is a cross-sectional view of another prior art example of an optical head for a BD using a blue laser beam manufactured by Sony Corporation.

The optical head shown in FIG. 2 is published in February 2003, entitled "Small Integrated Optical Head Device Using a Blue-violet Laser Diode for Blue-ray Disc System," Jpn. J. Appl. Phys. Vol. 42(2003), pp. 880-884, Part 1. No. 2B.

The optical head shown in FIG. 2 includes optical parts such as a blue beam LD 30, a 45 degree mirror 32, a half wave plate (HWP) 34, a grating 36, a PBS 38, a mirror 40, a HOE 42, a cylinder lens 44, a prism 46, a molded optical element, a PD IC 50, and a package 54 molded by a lead frame 52.

As shown in FIG. 2, the beam 56 emitted from the blue beam LD 30 is incident on a disc through the 45 degree mirror 32, the HWP 34, the grating 36, and the PBS 38. The beam 56 is reflected from the disc and then incident on the PD IC 50 through the PBS 38, the mirror 40, the HOE 42, and the cylinder lens 44.

The optical parts in the optical head shown in FIG. 2 are also disposed in a 3-dimensional space. In the optical head shown in FIG. 2, the HOE 42 is used; however, the overall thickness of the optical head still cannot be sufficiently and greatly reduced because the individual parts each occupying a predetermined volume in the 3-dimensional space are still used to assemble the optical head shown in FIG. 2.

As described above, the optical parts in a conventional optical head are disposed in a 3-dimensional space. This limits effective reduction of the overall thickness of a conventional optical head. As a result, the undesirable thickness of the conventional optical heads presents a fundamental obstacle to putting them together in an easily carryable, mobile optical disc for its intended practical portable use.

SUMMARY OF THE INVENTION

The present invention provides an optical head including optical parts that are not disposed on a 3-dimensional space.

The present invention also provides an optical head considerably reducing a thickness thereof by positioning optical parts on a planar waveguide having a single mode.

According to an aspect of the present invention, there is provided an optical head including: a light transmitting element emitting a beam; a planar waveguide formed on a substrate and receiving the beam oscillated from the light transmitting element; a beam input/output coupler integrated as a thin film on a portion of the planar waveguide and receiving the beam through the planar waveguide to transmit the beam vertically toward a disc positioned above the planar waveguide or transmitting the beam reflected from the disc through the planar waveguide; and light receiving elements receiving the beam propagated to the planar waveguide through the beam input/output coupler.

According to another aspect of the present invention, there is provided an optical head including: a light transmitting element emitting a beam; a planar waveguide formed on a substrate and receiving the beam oscillated from the light transmitting element; beam shaping mirrors positioned on a side of the substrate and changing a path of the beam oscillated from the light transmitting element and transmitted to the planar waveguide; a beam input/output coupler integrated as a thin film on a portion of the planar waveguide, receiving the beam having the changed path to transmit the beam vertically toward a disc positioned above the planar waveguide so as to record information and/or reproduce (read) information from the disc, and transmitting the beam reflected from the disc through the planar waveguide; a signal mirror positioned on a side of the substrate and changing a path of the beam transmitted to the planar waveguide through the beam input/output coupler; light receiving elements receiving the beam having the changed path through the planar waveguide;

and a signal processing circuit unit signal-processing the beam transmitted from the light receiving elements.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
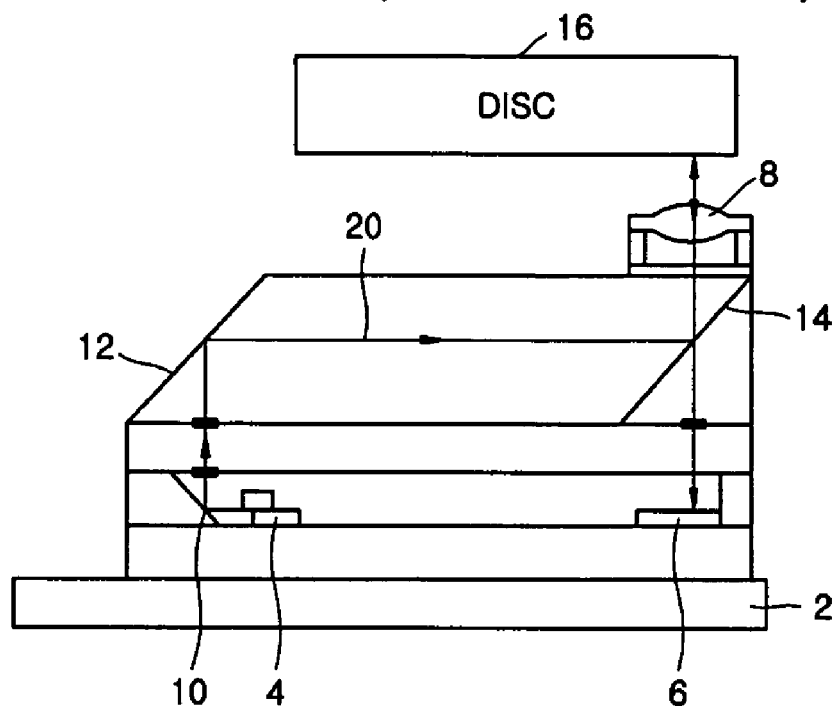
FIG. 1 is a cross-sectional view of an optical head according to prior art.
Figure 2:
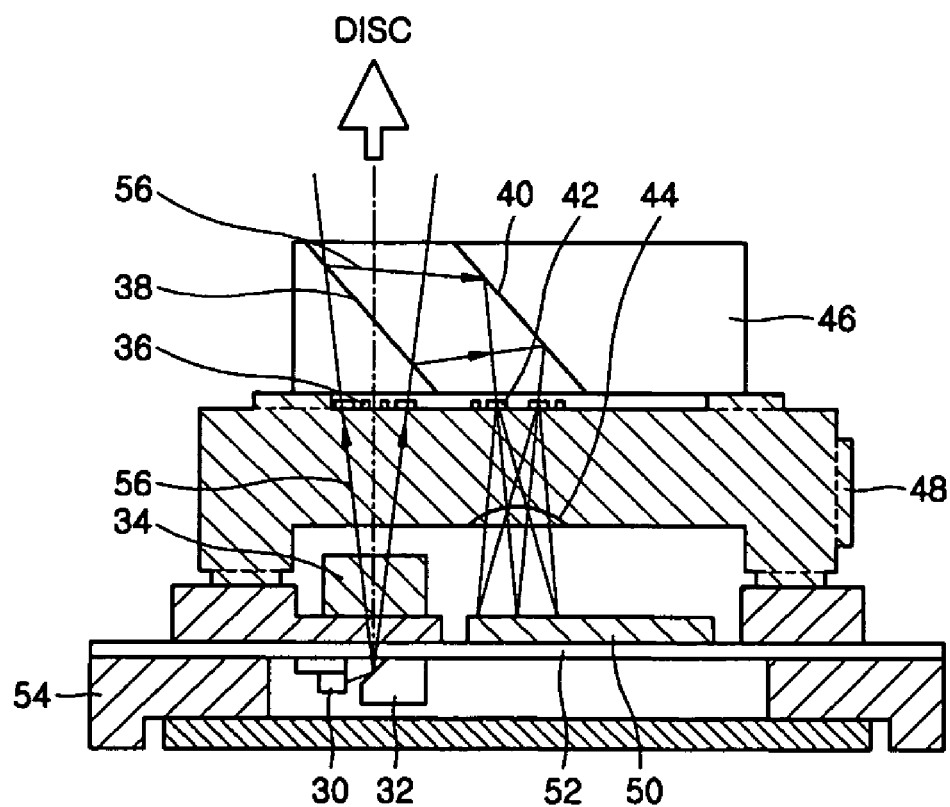
FIG. 2 is a cross-sectional view of another optical head according to prior art.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, thickness of the layers and regions are exaggerated for clarity.

Figure 3:
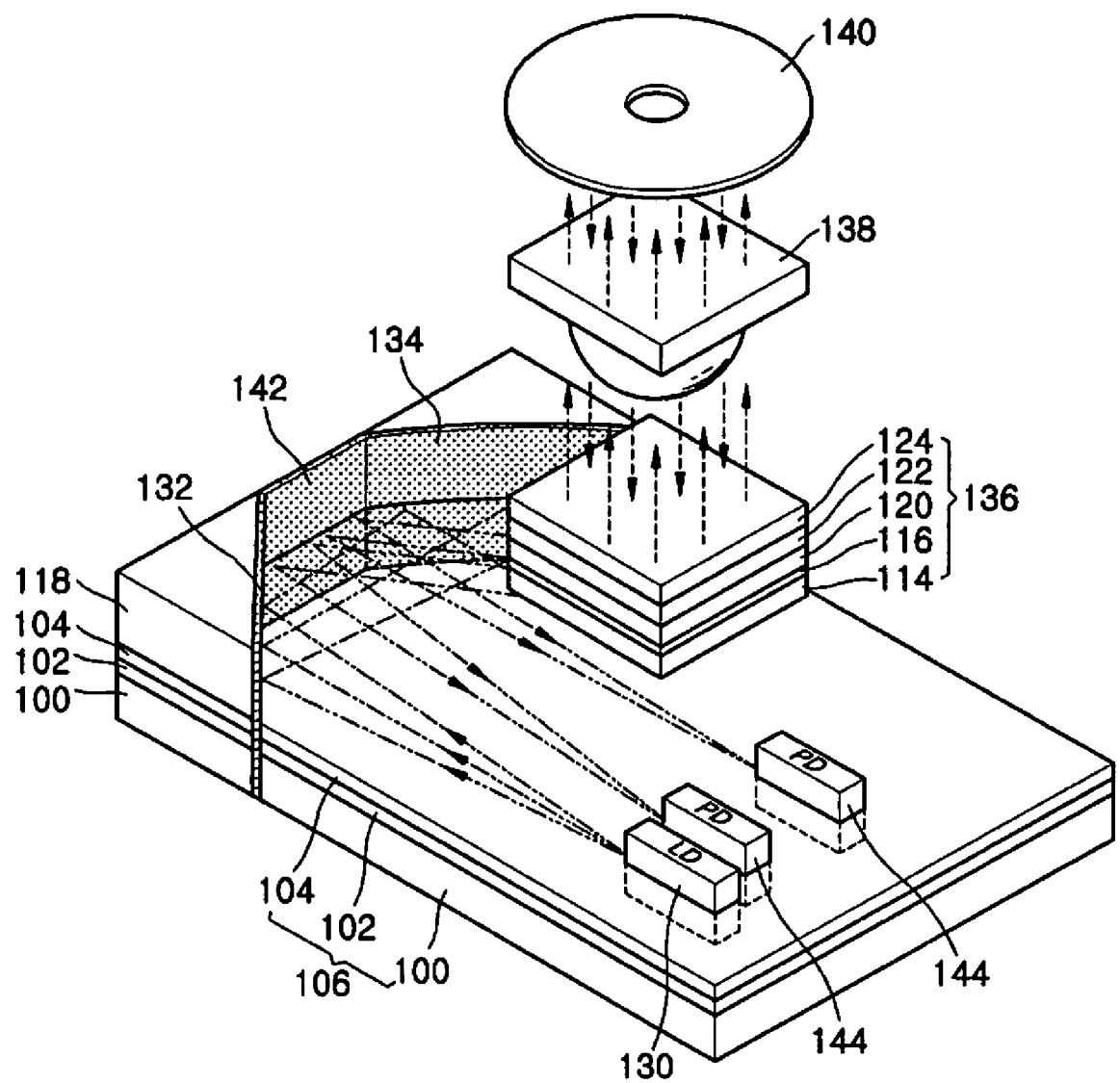
FIG. 3 is an enlarged perspective view of an optical head for recording and/or reproducing information on or from an optical or magneto-optical disc according to an embodiment of the present invention.

FIG. 3 is an enlarged perspective view of an optical head for recording and/or reproducing information on an optical or magneto-optical disc according to an embodiment of the present invention.

As shown in FIG. 3, the optical head according to an embodiment of the present invention includes a beam input/output coupler 136 formed in an area of a planar waveguide (slab waveguide) 106 having a single mode. In FIG. 3, the beam input/output coupler 136 is shown enlarged for clarity of detail. It is noted that some individual parts such as the beam/output coupler 136 shown in FIG. 3 or other figures of the present disclosure may not be drawn to scale. The planar waveguide 106 includes a planar core layer 102 and a lower clad layer 104 that are formed on a portion of a substrate 100, which may be a silica substrate. A clad layer 118 is formed on the lower clad layer 104 of the planar waveguide 106. In FIG. 3, portions of the clad layer 118 are not shown to expose the planar waveguide 106, particularly the lower clad layer 104.

The clad layer 118, the lower clad layer 104, the planar core layer 102, and the substrate 100 are etched to form beam-shaping mirrors (BSMs) 132 and 134 near the corners of the substrate 100 as shown in FIG. 3. A signal mirror (SM) 142 is formed at a sidewall of the substrate 100. To fabricate the BSMs 132, 134 and the SM 142 shown in FIG. 3, the clad layer 118, the lower clad layer 104, the planar core layer 102, and the substrate 100 are etched so that the planar core layer 102 of the planar waveguide 106 is exposed by etching, and then a metal thin film having a high reflectance such as aluminum or gold is filled inside the etched portions.

The beam input/output coupler 136 is positioned on a portion of the lower clad layer 104 of the planar wave guide layer 106 near the BSMs 132, 134. The beam input/output coupler 136 includes a leaky mode directional coupler (LMDC) 114, a hologram beam coupler 116, a PBS 120, a quarter wave plate 122, and an aberration correction (AC) layer 124. An objective lens 138 and a disc 140 are positioned on or above the beam input/output coupler 136.

An LD 130 (i.e., a light transmitting element) and PDs 144 (i.e., light receiving elements) are positioned above a portion of the substrate 100. The LD 130 transmits a beam in the planar core layer 102 of the planar waveguide 106, and the height of the light emitting portion in the LD 130 is preferably equal to the height of the planar core layer 102. The LD 130 may be installed in any position for satisfactory transmission of the beam in the planar core layer 102. In other words, a predetermined portion of the planar waveguide 106 may be etched to form the LD 130 in the etched portion, or the LD 130 may be separately installed outside the planar waveguide 106.

The PDs 144 receive beams guided by the planar core layer 102 of the planar waveguide 106, and the height of the beam receiving portion in each PD 144 is preferably equal to the height of the planar core layer 102. Similar to the LD 130 installation technique, the PDs 144 may be installed through an etched area of the planar waveguide 106, or alternatively the PDs 144 may be separately installed outside the planar waveguide 106.

In operation, the beam emitted from the LD 130 (i.e., the light transmitting element) propagates in the planar core layer 102 of the planar waveguide 106. The path of the beam is then corrected by the BSMs 132, 134 positioned as a reflective sidewall as shown in FIG. 3. The beam emitted from the LD 130 and reflected by the BSMs 132, 134 is then "leaked" into the beam input/output coupler 136. The beam input/output coupler 136 redirects the propagating beam inside the planar core layer 102 to vertically come out of the planar waveguide 106 through the beam input/output coupler 136 and then to pass through the objective lens 138. The beam that has passed through the objective lens 138 is incident on the disc 140 formed parallel to the planar waveguide 106 so as to record (i.e., write) and/or reproduce (i.e., read) information on or from the disc 140.

The beam reflected off the disc 140 enters the beam input/output coupler 136 and then propagates along the planar core layer 102 of the planar waveguide 106 but now corrected by the SM 142 (instead of the SMs 132, 134) to be received by the PDs 144.

The beam input/output coupler 136 is formed as an optical thin film compising a plurality of layers that are installed on an area of the planar waveguide 106. The thickness of the beam input/output coupler 136 is preferably equal to or less than the total combined thickness of the substrate 100, the planar planar waveguide 106, and the clad layer 118. Thus, in the present invention, the thickness of the optical head can be innovatively reduced.

In addition, according to an embodiment of the present invention, the characteristics of the planar waveguide or the beam input/output coupler can be controlled so that a light transmitting element is compatible with a blue ray disc (BD) using a blue laser beam having a short wavelength as well as infrared rays or a red laser beam used for a CD or a DVD.

Thus, an optical head compatible with various types of optical discs can be embodied, and a thickness of the optical head can be remarkably reduced. As a result, discs can be made to be compact.

Figure 4:
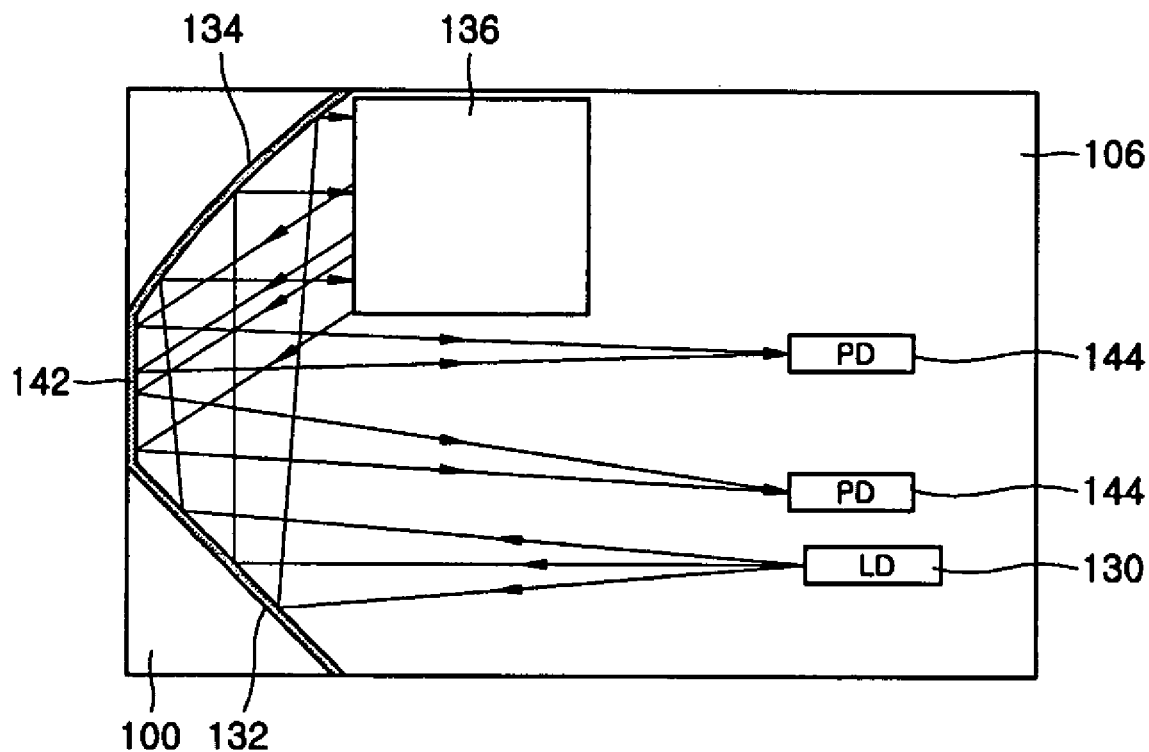
FIGS. 4 and 5 are a plan view and a cross-sectional view, respectively, of the optical head shown in FIG. 3.
Figure 5:
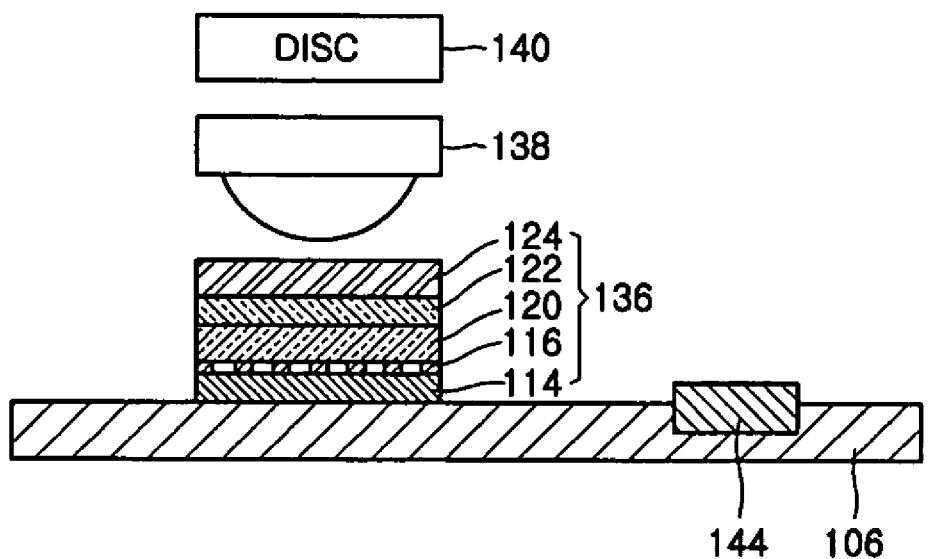
Figure 6:
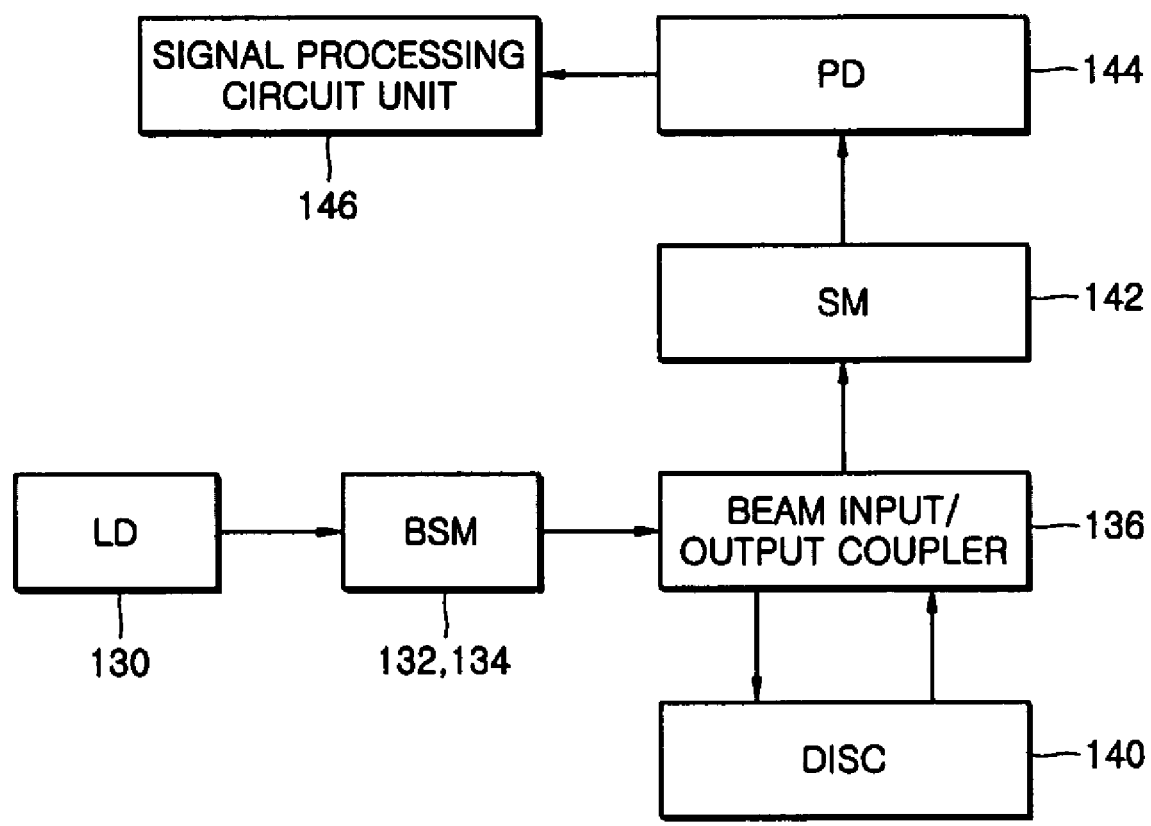
FIG. 6 is a functional block diagram of the optical head of FIG. 3.

With reference to FIGS. 4-6, the structure of the optical head is described in detail. FIG. 4 is a plan view illustrating an exemplary path of the propagating beam in the planar waveguide 106 of the optical head, and FIG. 5 is a cross-sectional view illustrating the structure of the beam input/output coupler 136 of the optical head. FIG. 6 is a functional block diagram of the optical head.

The optical head shown in FIGS. 4-5 according to an embodiment of the present invention includes the planar waveguide 106 comprising the lower clad layer 104, the planar core layer 102, and the substrate 100 (all of which are shown in FIG. 3) and has a single mode. The LD 130 is a light transmitting element emitting (radiating or transmitting) a beam into the planar waveguide layer 106. The PDs 144 are light detecting elements detecting the beams propagating in the planar waveguide layer 106. The beam input/output coupler 136 directs the path of the beam leaked into the beam input/output coupler 136 from the planar waveguide layer 106 such that the beam exiting the input/output coupler 136 is substantially perpendicular the planar waveguide layer 106. Similarly, the beam input/output coupler 136 allows the beam reflected off the disc 140 to propagate in the planar waveguide layer 106. In this embodiment, the beam entering and exiting the input/output coupler 136 is described to be substantially perpendicular to the planar waveguide layer 106; however, non-perpendicular angles of beam path entering and exiting the input/output coupler 136 with respect to the planar waveguide layer 106 is also possible and within the scope and spirit of the present disclosure. The structure and function of the beam input/output coupler 136 inputting and/or outputting the beam vertically from the ground is described in more detail below.

As shown in FIGS. 4-6, the beam emitted by the LD 130 propagates in the planar core layer 102 of the planar waveguide 106 and its path is corrected by the BSMs 132, 134. The optical parts such as the BSMs 132 and 134 also provide beam extension function.

The beam comes out of the planar waveguide 106 through the beam input/output coupler 136 in a direction perpendicular to the direction of the propagating beam in the planar waveguide 106 and then passes it to the objective lens 138. The beam passing through the objective lens 138 is incident on the disc 140 (which is parallel to the planar waveguide 106) to write or read information on the disc 140. The reflected beam off the disc 140 enters the planar waveguide 106 through the beam input/output coupler 136, as already explained above, for reception by the PDs 144 via the SM 142. The beam received by the PDs 144 are then inputted to a signal processing circuit unit 146 (shown in FIG. 6).

The beam input/output coupler 136 as shown in FIG. 4-6 is formed as an optical thin film comprising many layers, and details about the layers, which innovatively contributes to reducing the thickness of the optical head, are described in more detail below. The thickness of the beam input/output coupler 136 may be in the range of 100 μm to 200 μm. The layers of the optical thin film of the beam input/output coupler 136 according to an embodiment of the present invention include the LMDC 114, the hologram beam coupler 116 positioned on the LMDC 114, the PBS 120 positioned on the hologram beam coupler 116, the quarter wave plate 122, and the AC layer 124.

The LMDC 114 emits a beam proceeding toward the planar waveguide 106 upward at a predetermined angle with the planar waveguide 106 or allows a beam reflected from the disc 140 to be incident on the planar waveguide 106. The hologram beam coupler 116 emits the beam having passed through the LMDC 114 vertically from the ground or allows the beam reflected from the disc 140 to be incident on the LMDC 114 at a predetermined angle with the LMDC 114.

The PBS 120 and the quarter wave plate 122 polarize and pass the beam having passed through the LMDC 114 and the hologram beam coupler 116 and refract the polarized beam that is reflected from the disc 140 and incident on the beam input/output coupler 136 to change a traveling direction of the beam. When the traveling direction of the beam is changed, the beam is incident on the PDs 144 through the SM 142. The AC layer 124 corrects the aberration of the beam input/output coupler 136 formed of multi-layer thin films.

Figure 7B:
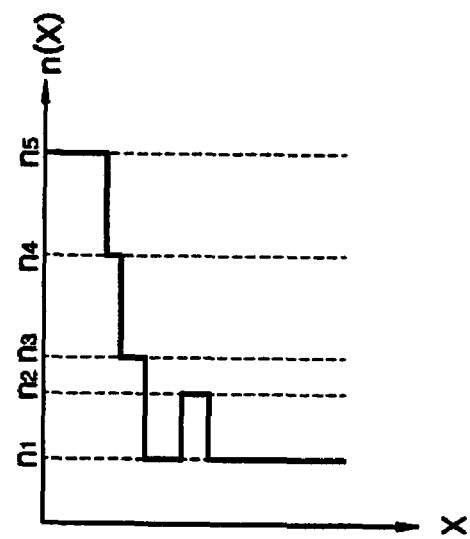
FIG. 7B shows a waveguide refractive index of the planar waveguide and the layers constituting the LMDC shown in FIG. 7A.
Figure 7A:
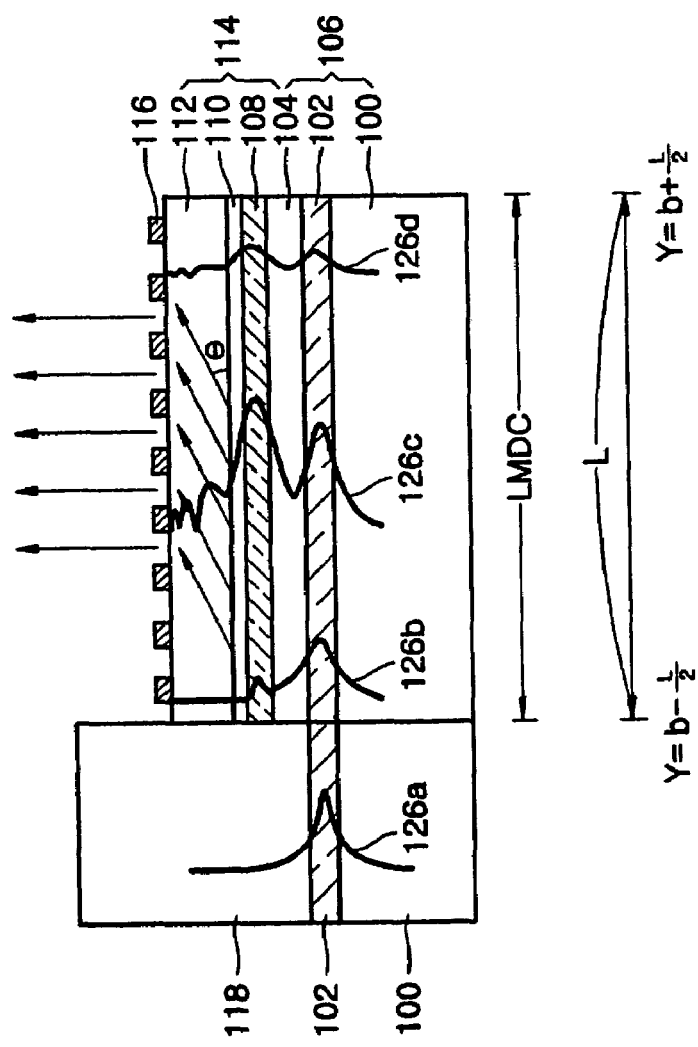
FIG. 7A is a cross-sectional view of a leaky mode directional coupler (LMDC) and a hologram beam coupler (HBC) constituting the beam input/output coupler of the optical head shown in FIG. 3.
Figures 8, 9:
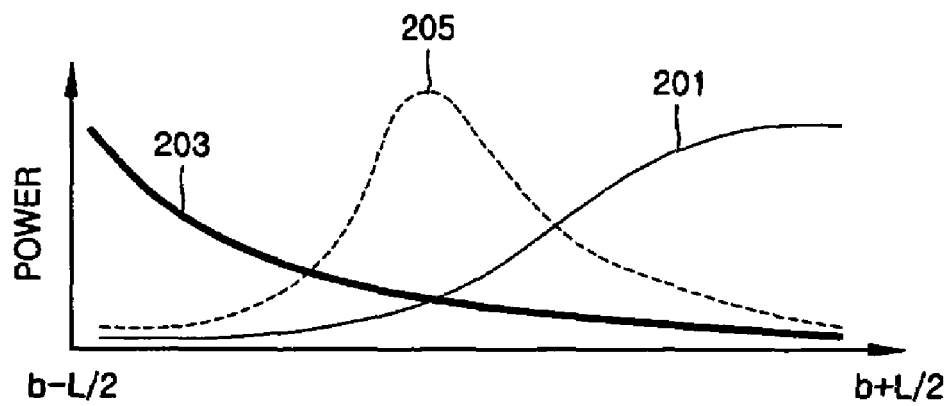
FIG. 8 is a table of thickness and refractive index difference of the layers constituting the LMDC in FIGS. 7A-7B.
FIG. 9 is a graph illustrating the power transmitting characteristics of the LMDC shown in FIG. 7A-7B.

FIG. 7A is a cross-sectional view of the LMDC 114 and the hologram beam coupler 116 of the beam input/output coupler 136 on the planar waveguide layer 106 of the optical head of an embodiment of the present invention. FIG. 7B shows the waveguide refractive index of the LMDC 114. FIG. 8 is a table of thicknesses and refractive index differences of layers of the LMDC 114.

As shown in FIG. 7, the LMDC 114 includes a leaky core layer 108, an inner clad layer 110, and the upper clad layer 112. The present invention as described and shown uses a waveguide mode in which a beam propagates along inside the planar core layer 102 of the planar waveguide 106 and a leaky mode in which a beam propagates through the leaky core layer 108 of the LMDC 114, thereby "leaking" the beam from the planar waveguide layer 106 toward the hologram beam coupler 116 through the LMDC 114, and in the reverse order. In FIG. 7, the left part of the cross-sectional view (i.e., toward 126a) denotes the characteristics of the beam only when the waveguide mode is in operation, and the right part of the cross-section (i.e., toward 126d) indicates that the characteristics of the beam when the waveguide mode is coupled to the leaky mode. The reference numerals 126a through 126d denote the distribution of the beam strength in each layer of the cross-section from the waveguide mode (as in 126a) to the couple wave guide mode and leaky mode (as in 126d).

The leaky core layer 108 of the LMDC 114 is formed on the planar waveguide 106. The planar waveguide 106 includes the substrate 100, the planar core layer 102 that is formed on the substrate 100 and has a refractive index $n_2$, and a portion of the lower clad layer 104 having a refractive index $n_1$ lower than the refractive index $n_2$. The thicknesses of the planar core layer 102 and the lower clad layer 104 are preferably 2.0 μm and 1.2 μm, respectively.

FIG. 7B shows refractive indexes of the layers constituting the planar waveguide 106 and the layers constituting the LMDC 114. $n_1$ denotes the refractive index of the lower clad layer 104, $n_2$ denotes the refractive index of the planar core layer 102, $n_3$ denotes the refractive index of the leaky core layer 108, $n_4$ denotes the refractive index of an inner clad layer 110, and $n_5$ denotes the refractive index of the upper clad layer 112.

Thus, the LMDC 114 contacting a portion of the lower clad layer 104 includes:
  (1) the leaky core layer 108 having the refractive index $n_3$ greater than the refractive index $n_2$;
  (2) the inner clad layer 110 having the refractive index $n_4$ greater than the refractive index $n_3$; and
  (3) the upper clad layer 112 having the refractive index $n_5$ greater than the refractive index $n_4$.

Thus, $n_5$ (of the layer 112)>$n_4$ (of the layer 110)>$n_3$ (of the layer 108)>$n_2$ (of the layer 102). The thickness of the leaky core layer 108, the inner clad layer 110, and the upper clad layer 112 are preferably 1.8 µm, 0.2 µm, and 1 µm, respectively.

In the "thickness" column of FIG. 8, the numerical value in parenthesis next to each thickness of the respective layer denotes the the thickness of the respective layer of the LMDC 114 but with reference to the surface of the inner clad layer 110 being 0, that is, X=0 at the surface of the inner clad layer 110. In this regard, (1) the value X of the upper clad layer 112 is less than "0," which means for example that 1 µm thick upper clad layer is located in the direction above the surface of the inner clad layer 110;

(2) the value X of the inner clad layer 110 is more than or equal to "0" but less than 0.2, which means for example that 0.2 µm thick inner clad layer 110 is located 0 to 0.2 µm in the direction below (or opposite the direction referenced in the X of the upper clad layer 112) the surface of the inner clad layer 110;

(3) the value X of the leaky core layer 108 is more than or equal to 0.2 bt less than 3.0, which means for example that 1.8 µm thick leaky core layer 108 is located 0.2 to 3.0 µm below the surface of the inner clad layer 110; and (4) the value X of the substrate 100 is more than or equal to 6.0, which means for example that a rather thick substrate layer 100 is located beginning 6.0 µm for example below the surface of the clad layer 110.

In the last column of FIG. 8, □n denotes the difference between the refractive index of a layer and the refractive index of the substrate 100 having the lowest refractive index. Thus, □n of the planar core layer 102 (i.e., the refractive index difference between the planar core layer 102 and the substrate 100) is 0.0027, □n of the leaky core layer 108 (i.e., the refractive index difference between the leaky core layer 108 and the substrate 100) is 0.0036, and □n of the lower clad layer is zero meaning that the refractive index of the lower clad layer 104 equals the refractive index of the substrate 100.

In general, the refractive index of a particular optical material is affected also by the wavelength of the light; therefore, the same material subjected to different light wavelengths may exhibit slightly different refractive indexes The above-mentioned refractive indexes are one set of exemplary values of the shown layers subjected to a blue light having a wavelength of 405 nm. In this case, the refractive index of the substrate 100 is 1.4702. Nevertheless, it should be noted that the scope of the present invention is not limited to those refractive indexes as shown in FIG. 8. Other wavelengths of light besides the blue light can be used to produce the same intended results as described and claimed herein without deviating the scope and spirit of the present invention.

The operations and functions of the LMDC 114 and the hologram beam coupler 116 will now be described.

In detail, a beam emitted by the LD 130 and being propagated in the planar waveguide 106 will leak to the upper clad layer 112 due to the leaky mode formed by the different refractive indexes and the gap existing between the core layers, i.e., between the planar core layer 102 and the leaky core layer 108, as shown in FIGS. 7 and 8. If the beams proceeding toward the planar core layer 102 are incident on the LMDC 114 and a condition n5>n4>n3>n2>n1 is satisfied, the leaky mode is formed. Under this leaky mode condition, the beams propagating in the planar core layer 102 of the planar waveguide 106 will leak to the LMCD 114.

In other words, the beams propagating in the planar core layer 102 will pass through the lower clad layer 104 and will be incident on the LMDC 114, because the refractive index of the lower clad layer 104 is lower than the refractive index of the core layer 102. Thus, the beams are able to propagate through the leaky core layer 108. Since the refractive index of the inner clad layer 110 is low, the beams coupled and proceeding toward the leaky core layer 108 are leaked toward the upper clad layer 112 at a predetermined angle. An angle θ of the beam propagated to the upper clad layer 112 is determined as in Equation 1:

$$\theta = \sin^{-1}(\beta 2/(n5/k0)) \qquad (1)$$

wherein β2 denotes a propagation constant in the LMDC 114, k0 denotes a propagation constant in a vacuum state, and $n_5$ denotes the refractive index of the upper clad layer 112. The LMDC 114 controls the refractive index of the upper clad layer 112 to control an amount and an angle of the beam propagated to the upper clad layer 112 and controls the thickness of the inner clad layer 110 to control coupling efficiency and a coupling length.

The LMDC 114 has a leaky beam having a maximum leaky effect and a Gaussian distribution within a range of (b−L/2)<Y<(b+L/2), where b denotes a distance from a beam input to the LMDC 114 to the center of the LMDC 114, L denotes a diameter of the LMDC 114, and Y denotes both ends of the LMDC 114.

In more detail, the beam incident on the planar core layer 102 of the planar waveguide 106 by the LD 130 proceeds from the left toward the right and then is incident on a starting point b−L/2 of the LMDC 114. Thus, the thickness of the lower clad layer 104 is controlled to sufficiently transmit a power from the waveguide mode toward the leaky mode so that a power of the waveguide mode is vanished at an ending side "b+L/2" of the planar waveguide 106. The power transmitted from the waveguide mode toward the leaky mode generates a leaky beam, maintaining a predetermined angle. The leaky beam is refracted by the hologram beam coupler 116 to proceed in a vertical direction so as to be transmitted toward the disc 140.

FIG. 9 is a graph illustrating the power-transmitting characteristics of the LMDC 114.

In detail, the distribution of an input beam propagated toward a hologram beam coupler may be formed in the form of Gaussian function. Beam loss of a leaky mode is reduced in index number along a direction toward which a beam proceeds as marked with reference numeral 203. Beam coupling toward the leaky mode is accumulated and increased along the direction toward which the beam proceeds as marked with reference numeral 201. Thus, a power distribution of a leaky beam that is a product of the beam loss and the beam coupling may be formed in the form of the Gaussian function as marked with reference numeral 205.

If the leaky beam has the Gaussian function form, an optical distortion caused by an asymmetric distribution of a beam can be reduced, and a signal reflected from a disc can be coupled in a waveguide mode. Reference numeral 203 denotes a power of the leaky mode reduced along the direction toward which the beam proceeds, reference numeral 201 denotes the power of the leaky mode accumulated along the direction, and reference numeral 205 denotes a power distribution of the leaky beam propagated to a hologram beam coupler.

As descried above, in an optical head having a beam input/output coupler on a planar waveguide according to an embodiment of the present invention, the optical parts necessary for forming the beams can be made of thin films on the planar waveguide. Also, the thicknesses of the optical parts are limited to a thickness of a waveguide. Thus, a thickness of the optical head can be innovatively reduced. In other words, individual optical parts necessary for the optical head are integrated on the planar waveguide having a single mode so as to be formed as individual bodies. Thus, the thickness of the optical head can be reduced.

Also, the characteristics of the planar waveguide or the beam input/output coupler can be controlled so that a light transmitting element is compatible with a BD using a blue laser beam having a short wavelength as well as infrared rays or a red laser beam used for a CD or a DVD. Thus, the optical head can be compatible with various types of discs. Also, the thickness of the optical head can be remarkably reduced. As a result, discs can be made compact.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical head comprising:
   a light transmitting element emitting a beam of light;
   a planar waveguide formed on a substrate and receiving the beam emitted from the light transmitting element;
   a beam input/output coupler having a plurality of thin films formed on a portion of the planar waveguide and stacked on each other,
   an optical disc formed on or above the beam input/output coupler,
      wherein the beam input/output coupler receives the beam from the planar waveguide and transmits the beam at an angle toward the disc, and
      wherein the beam input/output coupler receives the beam reflected from the disc and transmits the reflected beam into the planar waveguide; and
      wherein the plurality of thin films includes a leaky mode directional coupler emitting the beam propagating in the planar waveguide upward and allowing the beam reflected from the disc to be incident on the planar waveguide, and a beam splitter separating the beam emitted upward by the leaky mode directional coupler and the beam reflected from the disk.
   a light receiving element receiving the reflected beam transmitted into the planar waveguide through the beam input/output coupler.

2. The optical head of claim 1, further comprising a beam shaping mirror formed in a portion of the planar waveguide as a reflective sidewall to change the path of the beam emitted from the light transmitting element propagating in the planar waveguide.

3. The optical head of claim 1, further comprising a signal mirror formed in a portion of the planar waveguide as a reflective sidewall to change the path of the reflected beam in the planar waveguide, wherein the reflected beam is the beam reflected from the disc and transmitted into the planar waveguide through the beam input/output coupler.

4. The optical head of claim 1, wherein the direction of the beam transmitted by the input/output coupler to the optical disc is about perpendicular to the planar waveguide, and
   wherein the direction of the beam reflected from the disc and transmitted into the planar waveguide is about perpendicular to the planar wave guide.

5. The optical head of claim 1, wherein either the light emitting element or the light receiving element is formed in an etched portion of the planar waveguide.

6. The optical head of claim 5, wherein the thickness of either the light emitting element or the light receiving element is less than the thickness of the planar waveguide.

7. The optical head of claim 6, wherein the light emitting element comprises a laser diode, and wherein the light receiving element comprises a photo diode.

8. The optical head of claim 1, wherein the planar waveguide comprises:
   a planar core layer having a refractive index $n_2$ formed on the substrate; and
   a lower clad layer having a refractive index $n_1$ formed on the planar core layer, wherein $n_2 > n_1$, and
   wherein the leaky mode directional coupler comprises:
      a leaky core layer having a refractive index $n_3$ formed on the lower clad layer;
      an inner clad layer having a refractive index $n_4$ formed on the leaky core layer; and
      an upper clad layer having a refractive index $n_5$ formed on the inner clad layer,
   wherein $n_5 > n_4 > n_3 > n_2 > n_1$ to form a leaky mode in the leaky mode directional coupler such that the beam propagating in the planar waveguide is leaked into the leaky mode direction coupler.

9. An optical head comprising:
   a light transmitting element emitting a beam of light;
   a planar waveguide formed on a substrate and receiving the beam emitted from the light transmitting element;
   a beam input/output coupler having a plurality of thin films formed on a portion of the planar waveguide,
   an optical disc formed on or above the beam input/output coupler,
      wherein the beam input/output coupler receives the beam from the planar waveguide and transmits the beam at an angle toward the disc, and
      wherein the beam input/output coupler receives the beam reflected from the disc and transmits the reflected beam into the planar waveguide; and
   a light receiving element receiving the reflected beam transmitted into the planar waveguide through the beam input/output coupler,
      wherein the beam input/output coupler comprises:
         a leaky mode directional coupler;
         a hologram beam coupler formed on the leaky mode directional coupler;
         a polarized beam splitter formed on the hologram beam coupler;
         a quarter wave plate formed on the polarized beam splitter; and
         an aberration correction layer formed on the quarter wave plate.

10. The optical head of claim 9, wherein the leaky mode directional coupler comprises a leaky core layer formed on the planar waveguide.

11. The optical head of claim 9, wherein the planar waveguide comprises:
   a planar core layer having a refractive index $n_2$ formed on the substrate; and
   a lower clad layer having a refractive index $n_1$ formed on the planar core layer, wherein $n_2 > n_1$.

12. The optical head of claim 11, wherein the leaky mode directional coupler comprises:
   a leaky core layer having a refractive index $n_3$ formed on the lower clad layer;
   an inner clad layer having a refractive index $n_4$ formed on the leaky core layer; and
   an upper clad layer having a refractive index $n_5$ formed on the inner clad layer,
      wherein $n_5 > n_4 > n_3 > n_2 > n_1$ to form a leaky mode in the leaky mode directional coupler such that the beam propagating in the planar waveguide is leaked into the leaky mode direction coupler.

13. The optical head of claim 12, wherein the hologram beam coupler transmits the beam leaked into the leaky mode directional coupler in a vertical direction, and
wherein the hologram beam coupler allows the beam reflected off the disc to be incident on the leaky mode directional coupler at a predetermined angle.

14. The optical head of claim 9, wherein the polarized beam splitter and the quarter wave plate polarize and pass the beam having passed through the leaky mode directional coupler and the hologram beam coupler, and
wherein the polarized beam splitter and the quarter wave plate polarize the beam reflected from the disc to change a direction of the beam so as to transmit the beam to the light receiving element.

15. The optical head of claim 9, wherein the aberration correction layer installed on the quarter wave plate corrects aberration of the beam input/output coupler comprising multilayer thin films.

16. An optical head comprising:
a light transmitting element emitting a beam of light;
a planar waveguide formed on a substrate and receiving the beam emitted from the light transmitting element;
a beam shaping mirror formed in a portion of the planar waveguide as a reflective sidewall to change the path of the beam emitted from the light transmitting element propagating in the planar waveguide;
a beam input/output coupler having a plurality of thin films formed in a portion of the planar waveguide and stacked on each other,
wherein the beam input/output coupler receives the beam reflected off the beam shaping mirror and transmits the beam in a direction substantially vertical to the planar waveguide toward a disc positioned on or above the planar waveguide so as to record and/or reproduce (read) information from the disc, and
wherein the beam input/output coupler transmits the beam reflected off the disc into the planar waveguide;
a signal mirror formed in a portion of the planar waveguide as a reflective sidewall to change the path of the beam reflected off the disc and transmitted into the planar waveguide;
wherein the beam shaping mirror and the signal mirror are formed such that each of the beam shaping mirror and the signal mirror extends within the planar waveguide in a vertical direction,
a light receiving element receiving the beam reflected off the signal mirror; and
a signal processing circuit unit for signal-processing the beam received by the light receiving element.

17. The optical head of claim 16, wherein the beam input/output coupler comprises:
a leaky mode directional coupler;
a hologram beam coupler formed on the leaky mode directional coupler;
a polarized beam splitter formed on the hologram beam coupler;
a quarter wave plate formed on the polarized beam splitter; and
an aberration correction layer formed on the quarter wave plate.

18. The optical head of claim 17, wherein the leaky mode directional coupler comprises a leaky core layer formed on the planar waveguide,
wherein the leaky core layer emits the beam propagating in the planar waveguide upward at a predetermined angle according to a leaky mode, or
wherein the leaky core layer allows the beam reflected off the disc to be incident on the planar waveguide.

19. The optical head of claim 16, wherein the planar waveguide comprises:
a planar core layer having a refractive index $n_2$ formed on the substrate; and
a lower clad layer having a refractive index $n_1$ formed on the planar core layer, wherein $n_2 > n_1$.

20. The optical head of claim 19, wherein the beam input/output coupler comprises a leaky mode directional coupler, and the leaky mode directional coupler comprises:
a leaky core layer having a refractive index $n_3$ formed on the lower clad layer;
an inner clad layer having a refractive index $n_4$ formed on the leaky core layer; and
an upper clad layer having a refractive index $n_5$ formed on the inner clad layer,
wherein $n_5 > n_4 > n_3 > n_2 > n_1$ to form a leaky mode in the leaky mode directional coupler such that the beam propagating in the planar waveguide is leaked into the leaky mode direction coupler.

* * * * *